(12) United States Patent
Takahashi

(10) Patent No.: US 10,380,502 B2
(45) Date of Patent: Aug. 13, 2019

(54) CALCULATION APPARATUS, CALCULATION METHOD, LEARNING APPARATUS, LEARNING METHOD, AND PROGRAM

(71) Applicant: INTERNATIONAL BUSINESS MACHINES CORPORATION, Armonk, NY (US)

(72) Inventor: Rikiya Takahashi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 936 days.

(21) Appl. No.: 14/947,031

(22) Filed: Nov. 20, 2015

(65) Prior Publication Data
US 2016/0148120 A1    May 26, 2016

(30) Foreign Application Priority Data

Nov. 20, 2014  (JP) ................................ 2014-235353

(51) Int. Cl.
*G06N 5/04*    (2006.01)
*G06N 20/00*   (2019.01)
(Continued)

(52) U.S. Cl.
CPC ............. *G06N 20/00* (2019.01); *G06F 17/18* (2013.01); *G06K 9/00* (2013.01); *G06Q 30/00* (2013.01);
(Continued)

(58) Field of Classification Search
USPC ..................................... 706/12, 45
See application file for complete search history.

(56) References Cited

FOREIGN PATENT DOCUMENTS

| JP | 2005284470 | 10/2005 |
|----|------------|---------|
| JP | 2009277067 | 11/2009 |

(Continued)

OTHER PUBLICATIONS

Schneider, Hybrid Long-Distance Functional Dependency Parsing, Doctoral Thesis, University of Zurich, Aug. 2007, pp. 1-277 (Year: 2007).*

(Continued)

*Primary Examiner* — Wilbert L Starks
(74) *Attorney, Agent, or Firm* — F. Chau & Associates, LLC

(57) ABSTRACT

A calculation apparatus includes a feature vector acquisition unit for acquiring a feature vector that corresponds to each alternative of a plurality of choice sets; an absolute evaluation calculation unit for calculating an absolute evaluation vector that represents an absolute evaluation of alternatives independent of a combination of the plurality of alternatives; a relativized-matrix calculation unit for calculating a relativized matrix that represents relative evaluations of the plurality of alternatives in a choice set; and a relative evaluation calculation unit for calculating a relative evaluation vector that represents a relative evaluation of each alternative of the plurality of alternatives from a product of multiplying the relativized matrix by the absolute evaluation vector. The calculation apparatus can predict intransitive choices of a person who exhibits intransitive preferences.

20 Claims, 5 Drawing Sheets

(51) Int. Cl.
  G06F 17/18 (2006.01)
  G06K 9/00 (2006.01)
  G06Q 30/00 (2012.01)
  G06K 9/68 (2006.01)
  G06K 9/62 (2006.01)

(52) U.S. Cl.
  CPC .......... *G06K 9/6215* (2013.01); *G06K 9/685* (2013.01); *G06N 5/04* (2013.01)

(56) References Cited

FOREIGN PATENT DOCUMENTS

| JP | 2011065504 | 3/2011 |
| JP | 2012242848 | 12/2012 |
| JP | 2013109470 | 6/2013 |

OTHER PUBLICATIONS

John Von Neumann, et al. "Theory of Games and Economic Behavior," Princeton University Press, Princeton, NJ, Publication Date 1944.

Joel Huber, et al., "Adding asymmetrically dominated alternatives: Violations of regularity and the similarity hypothesis," Journal of Consumer Research, vol. 9, No. 1, (Jun. 1982) pp. 90-98.

Itamar Simonson, "Choice based on reasons: The case of attraction and compromise effects," Journal of Consumer Research, vol. 16, Sep. 1989, pp. 158-174.

Robert M. Roe, et al., "Multialternative decision field theory: A dynamic connectionist model of decision making," Psychological Review, vol. 108, No. 2, 2001, pp. 370-392.

Claudia Gonzales-Vallejo, "Making trade-offs: A probabilistic and context-sensitive model of choice behavior," Psychological Review, vol. 109, No. 1, 2002, pp. 137-155.

\* cited by examiner

CALCULATION APPARATUS, CALCULATION METHOD, LEARNING APPARATUS, LEARNING METHOD, AND PROGRAM

CROSS-REFERENCE TO RELATED APPLICATIONS

This U.S. non-provisional patent application claims priority under 35 U.S.C. § 119 from, and the benefit of, Japanese Patent Application No. 2014-235353, filed on Nov. 20, 2014, the contents of which are herein incorporated by reference in their entirety.

TECHNICAL FIELD

Embodiments of the present disclosure are directed to a calculation apparatus, a calculation method, a learning apparatus, a learning method, and a program.

DISCUSSION OF THE RELATED ART

A discrete choice model can be used to predict a person's choice using a utility function. The discrete choice model is based on the presumption that plural alternatives are complete and transitive, where completeness means that the degrees of preference for alternative A and alternative B are any of the following: "B is preferred to A," "A is preferred to B," and "A and B are preferred equally"; and transitivity means that if B is preferred to A while C is preferred to B, then C is preferred to A. However, in actual choices made by real people, other effects, such as an attraction effect, a compromise effect, etc., may be observed when transitivity is lacking. Mathematical models that can predict intransitive choices are known, but the conventional techniques cannot stably estimate model parameters for large quantities of data containing a large number of consumers and a large number of products.

SUMMARY

Embodiments of the present disclosure can learn actual choices of a person who has intransitive preferences and thereby predict intransitive choices. Embodiments of the present disclosure can provide an apparatus, method, and/or program which can be stably applied to large quantities of learning data.

According to an embodiment of the present disclosure, there are provided a calculation apparatus, a calculation method using the calculation apparatus, and a program used by the calculation apparatus. The calculation apparatus comprises: a feature vector acquisition unit for acquiring a feature vector that corresponds to each of a plurality of alternatives included in each of a plurality of choice sets; an absolute evaluation calculation unit for calculating an absolute evaluation vector that represents absolute evaluations of respective alternatives independent of a combination of the plurality of alternatives based on the feature vector corresponding to each alternative; a relativized-matrix calculation unit for calculating a relativized matrix that represents relative evaluations of the plurality of alternatives in the choice sets; and a relative evaluation calculation unit for calculating a relative evaluation vector that represents a relative evaluation of each alternative of the plurality of alternatives from a product of multiplying the relativized matrix by the absolute evaluation vector.

According to another embodiment of the present disclosure, there are provided a learning apparatus for learning parameters of a calculation apparatus, a learning method using the learning apparatus, and a program used by the learning apparatus. The learning apparatus comprises: a learning data acquisition unit for acquiring learning data for each set of a plurality of alternatives, the learning data including a feature vector of each of the plurality of alternatives, and choice information which represents an alternative chosen by a user from the plurality of alternatives; and a learning processor for improving a relative evaluation of the alternative represented by the choice information in the relative evaluation vector by adjusting a conversion parameter that converts the feature vectors into the absolute evaluation vector.

DETAILED DESCRIPTION OF EXEMPLARY EMBODIMENTS

Figure 1:
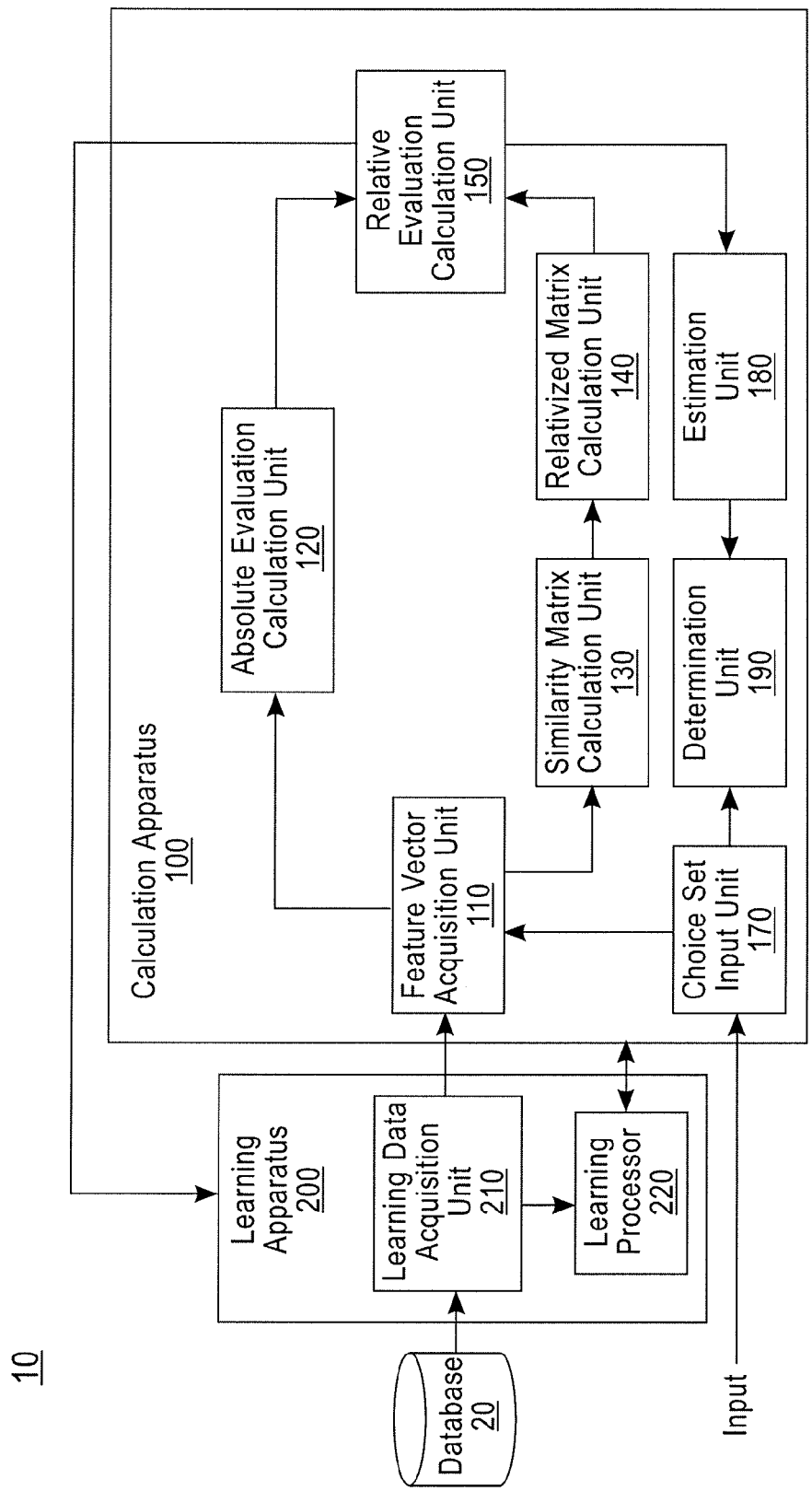
FIG. 1 is a block diagram of a system according to an embodiment of the present disclosure.

Embodiments of the present disclosure will be described below with reference to the drawing figures, but the exemplary embodiments are not intended to limit the claimed disclosure.

FIG. 1 is a block diagram of a system 10 comprising a calculation apparatus 100 and a learning apparatus 200 according to an embodiment of the present disclosure. The calculation apparatus 100 calculates relative evaluations of an alternative with respect to other alternatives, and the learning apparatus 200 learns parameters using learning data, where the parameters are used by the calculation apparatus 100 to calculate the evaluations.

According to an embodiment, the calculation apparatus 100 receives input information about a choice set, i.e. a set of alternatives, including a plurality of alternatives and calculates a relative evaluation of each alternative in the choice set from features of the various alternatives in the choice set. The calculation apparatus 100 includes a feature vector acquisition unit 110, an absolute evaluation calculation unit 120, a similarity matrix calculation unit 130, a relativized-matrix calculation unit 140, a relative evaluation calculation unit 150, a choice set input unit 170, an estimation unit 180, and a determination unit 190.

According to an embodiment, the feature vector acquisition unit 110 acquires a feature vector corresponding to each of a plurality of alternatives included in each of a plurality of choice sets and represents a feature of the corresponding alternative. The feature vector acquisition unit 110 generates a feature matrix from the feature vectors of plural alternatives for each acquired choice set and sends the feature matrices to the absolute evaluation calculation unit 120 and similarity matrix calculation unit 130.

According to an embodiment, the absolute evaluation calculation unit 120 calculates an absolute evaluation vector that represents the absolute evaluations of respective alternatives independent of a combination of the plurality of alternatives, based on the feature vector corresponding to each alternative. For example, the absolute evaluation calculation unit 120 calculates the absolute evaluation vector based on a product of multiplying the feature vector of each alternative by a weight vector used to weight each feature value. An example of a method for calculating the absolute evaluation vector will be described below. The absolute evaluation calculation unit 120 sends the calculated absolute evaluation vectors to the relative evaluation calculation unit 150.

According to an embodiment, the similarity matrix calculation unit 130 calculates a similarity matrix that represents the similarity of feature vectors among plural alternatives. For example, the similarity matrix calculation unit 130 calculates the similarity matrix based on a product of multiplying the feature matrix by a predetermined constant matrix and the transpose of the feature matrix. The similarity matrix calculation unit 130 sends the calculated similarity matrices to the relativized-matrix calculation unit 140.

According to an embodiment, the relativized-matrix calculation unit 140 calculates a relativized matrix that represents a transformation of relative evaluations of a plurality of alternatives based on the similarity matrix when the plurality of alternatives is presented in the choice sets. The relativized matrix, when multiplied by the absolute evaluation vector, improves the evaluation of two alternatives with a high similarity compared to two alternatives with a low similarity. An example of a method of calculating a relativized matrix will be described below. The relativized-matrix calculation unit 140 sends the calculated relativized matrices to the relative evaluation calculation unit 150.

According to an embodiment, the relative evaluation calculation unit 150 calculates the relative evaluations of the alternatives based on the absolute evaluation vector and relativized matrix. For example, the relative evaluation calculation unit 150 calculates a relative evaluation vector that represents the relative evaluation of each alternative from the plurality of alternatives based on the product of multiplying the relativized matrix by the absolute evaluation vector. The relative evaluation calculation unit 150 sends the relative evaluation vector to the estimation unit 180 and learning apparatus 200.

According to an embodiment, the choice set input unit 170 receives a predetermined alternative, referred to as a "target alternative", from a user as well as a plurality of choice sets each having a different combination of alternatives, including a target alternative. The choice set input unit 170 sends the plurality of choice sets to the feature vector acquisition unit 110, and the absolute evaluation calculation unit 120, similarity matrix calculation unit 130, relativized-matrix calculation unit 140, and relative evaluation calculation unit 150 process and calculate a relative evaluation of each alternative in the received plural choice sets. The choice set input unit 170 further sends the received plural choice sets to the determination unit 190.

According to an embodiment, the estimation unit 180 estimates the choice probability of each alternative in the choice set being chosen, based on the relative evaluation of each alternative in the relative evaluation vector received from the relative evaluation calculation unit 150. For example, the estimation unit 180 estimates choice probabilities of a target alternative from a plurality of choice sets. The estimation unit 180 sends estimation results to the determination unit 190.

According to an embodiment, based on the relative evaluation of the target alternative, the determination unit 190 chooses a choice set from which the chooser is highly likely to choose the target alternative, from the plural choice sets received from the choice set input unit 170 and determines a combination of other alternatives to be presented along with the target alternative. For example, the determination unit 190 determines a choice set which will increase the choice probability of the target alternative.

In this way, based on features of the alternatives included in the choice set, the calculation apparatus 100 calculates the chooser's preferences for the alternatives in the choice set as relative evaluations. In addition, the calculation apparatus 100 determines a choice set to be presented to a user so that the user can choose a target alternative.

According to an embodiment, the learning apparatus 200 learns parameters to be used by the calculation apparatus 100 for calculating relative evaluations from relationships between features of plural alternatives and an alternative chosen by a user. The learning apparatus 200 includes a learning data acquisition unit 210 and a learning processor 220.

According to an embodiment, the learning data acquisition unit 210 acquires learning data. For example, in relation to each choice set, the learning data acquisition unit 210 acquires learning data that includes a feature vector that represents features of the plural alternative and choice information that represents an alternative chosen by a user from the plural alternatives.

For example, the learning data acquisition unit 210 can acquire a purchase history that includes correspondences between sets of plural, alternative, products presented to a user and actually chosen products from a database 20, generates feature vectors based on values obtained by quantifying features, such as performances and prices, of the alternative products in each choice set, and acquires a set of the feature vectors and choice information as learning data. The learning data acquisition unit 210 provides the acquired learning data to the learning processor 220 and calculation apparatus 100.

According to an embodiment, while the calculation apparatus 100 calculates the relative evaluations of the alternatives included in the learning data, the learning processor 220 learns the parameters used by the calculation apparatus 100 to calculate the relative evaluations while adjusting the parameters so that the calculation results of the calculation apparatus 100 will be consistent with the learning data.

In this way, using learning data that includes feature vectors based on plural choice sets and alternatives actually chosen from the choice sets, the calculation apparatus 100 can learn s to calculate the relative evaluations of the alternatives more accurately.

Figure 2:
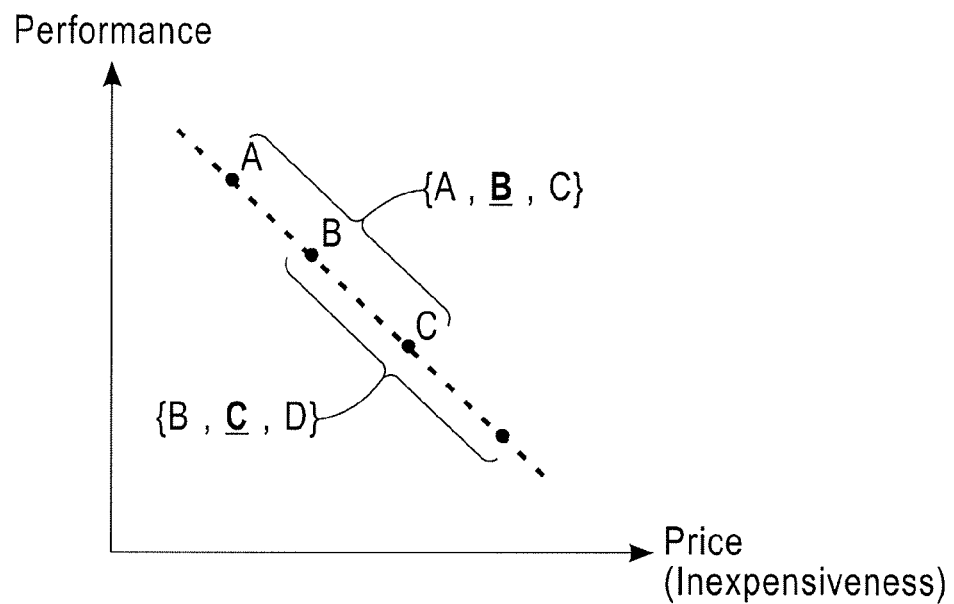
FIG. 2 illustrates a compromise effect in a person's choice.

FIG. 2 illustrates a compromise effect in a person's choice, according to an embodiment. The graph of FIG. 2 shows a relationship between performance and price of alternative products A to D. The dotted line in FIG. 2 indicates a virtual Pareto boundary and it is assumed that products A to D are located on the Pareto front and have more of the same absolute evaluations.

Now, if a choice set of alternatives—product A, product B, and product C—is presented, a user may show a tendency to choose product B, which has an intermediate performance and price, from the choice set. If a choice set of alternatives—product B, product C, and product D—is presented, the user may show a tendency to choose product C, which has an intermediate performance and price, from the choice set. In this way, the user shows a tendency to choose a moderate product from plural alternatives having more similar absolute evaluations by avoiding extreme choices. From another perspective, the user tends to choose an alternative with a large number of similar alternatives more frequently than an alternative with a small number of similar alternatives.

Figure 3:
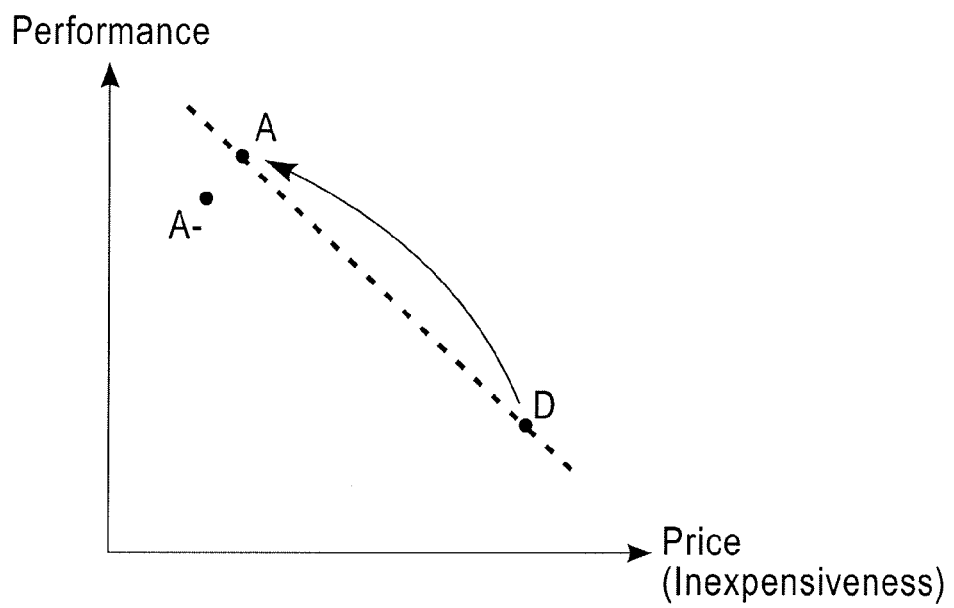
FIG. 3 illustrates an attraction effect in a person's choice.

FIG. 3 illustrates an attraction effect in a person's choice, according to an embodiment. The ordinate, abscissa, and dotted line in the graph of FIG. 3 are the same as in FIG. 2. If a choice set of three alternatives, i.e., product A, product D, and product A−, is presented, where product A and product D are located on the Pareto boundary and have similar absolute evaluations while product A− is similar to product A, but inferior to product A in absolute evaluation, the user shows a tendency to choose product A. In this way, the user tends to choose an alternative (alternative A) for which there is a similar but decidedly inferior alternative over an alternative (alternative D) for which there is no similar, inferior alternative.

In this way, for a choice model which exhibits intransitivity, by taking into consideration the absolute evaluation of an alternative and situations of other similar alternatives, i.e., alternatives which lend themselves readily to comparison, a relative evaluation of the alternative can be obtained from the user. For example, the user may be considered to be a Bayesian who estimates a relative evaluation corresponding to the Bayes posterior probability based on a prior distribution that corresponds to similarity and the absolute evaluation obtained from a utility function.

That is, according to an embodiment, it can be assumed that a user can find Bayesian shrinkage estimates of the relative evaluations of alternatives based on similarity of the alternatives by regarding a normal process as a prior distribution and statistically selecting an alternative which maximizes the Bayes posterior expectation. According to an embodiment, it can be assumed that the influence of the prior distribution on the user's choice corresponds to the user's intuition and that the influence of the absolute evaluation corresponds to user's rational judgment.

Based on this assumption, the calculation apparatus 100 according to a present embodiment calculates final evaluations, i.e., relative evaluation values, of the alternatives in the choice set from the absolute evaluations of the alternatives and relative evaluations of the alternatives. This allows the calculation apparatus 100 to model a person's intransitive choices, including compromise effects and attraction effects.

Although a present embodiment was described in a context of consumers choosing products, embodiments of the disclosure are not limited thereto. For example, the calculation apparatus 100 and learning apparatus 200 of the system 10 can be applied to a situation in which a choosing entity capable of decision making, such as an individual, group, robot, and/or animal, chooses one or more alternatives of an object or objects to be selected, from a choice set such as a set of products, set of services, set of objects to be operated, and/or set of objects to be acquired.

Figures 4, 5:
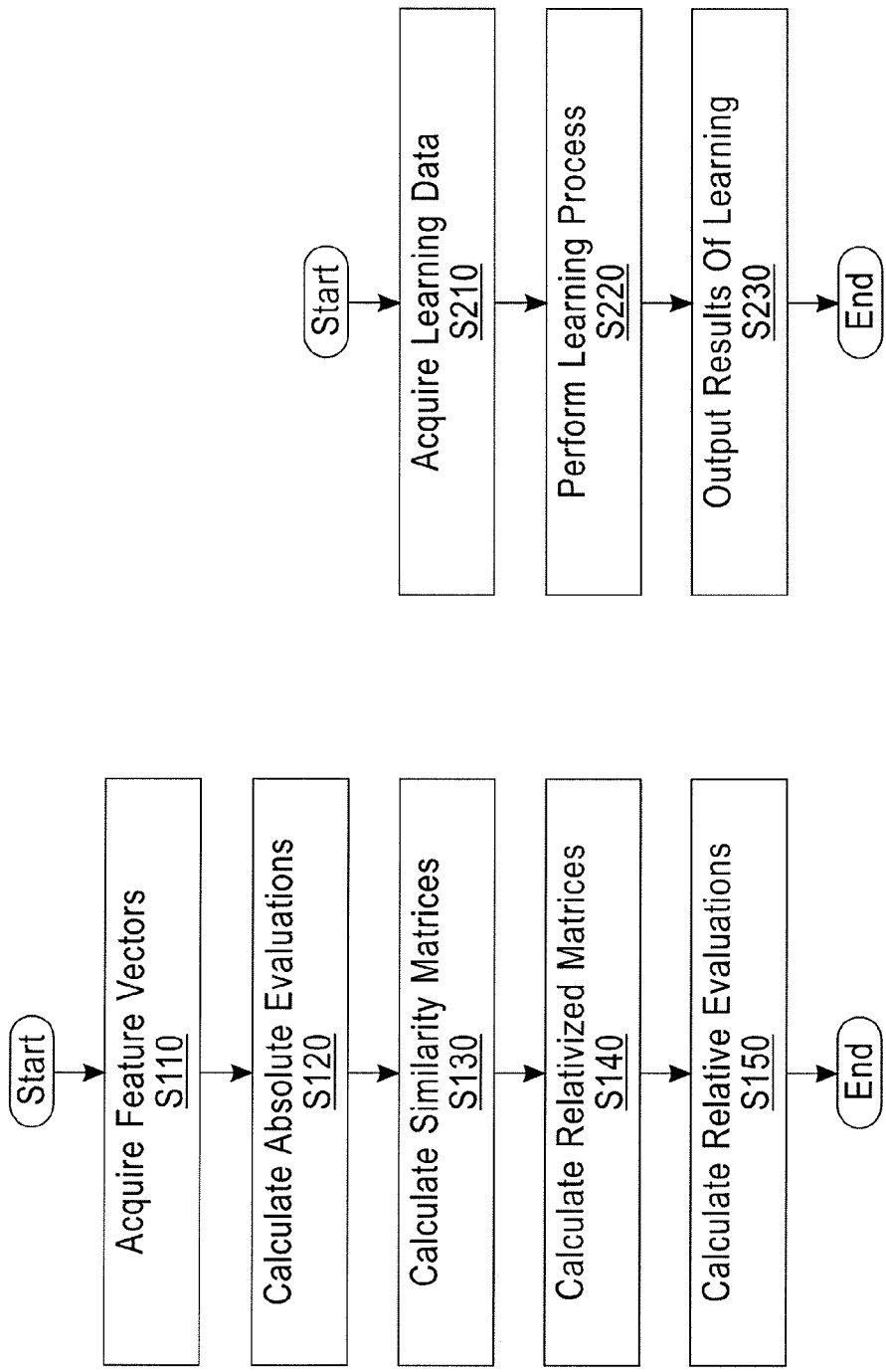
FIG. 4 is a flowchart of a method of calculating according to a present embodiment.
FIG. 5 is a flowchart of a method of learning according to a present embodiment.

FIG. 4 is a flowchart of a method of calculating according to a present embodiment. In a present embodiment, by performing steps S110 to S150, the calculation apparatus 100 calculates a relative evaluation that corresponds to a probability that each alternative in a choice set will be chosen.

First, in step S110, the feature vector acquisition unit 110 receives a feature vector which represents a feature of each alternative in each choice set i. For example, the feature vector acquisition unit 110 receives feature vectors $D_{\phi j}$ that represent the alternatives j in the choice set i from the learning apparatus 200.

Next, the feature vector acquisition unit 110 generates a feature matrix $\phi_i$ from the feature vectors $D_{\phi j}$ of m[i] alternatives j contained in the i-th choice set I, where i is an integer greater than equal to 1 and m[i] is an integer greater than 1, and sends the feature matrix to the absolute evaluation calculation unit 120 and similarity matrix calculation unit 130. For example, the feature vector acquisition unit 110 sends a feature matrix $\phi_i=(D_{\phi 1}, D_{\phi 2}, \ldots, D_{\phi m[i]})$ created by arranging the feature vectors $D_{\phi j}$ of m[i] alternatives in the i-th choice set to the absolute evaluation calculation unit 120 and the similarity matrix calculation unit 130.

Next, in step S120, the absolute evaluation calculation unit 120 calculates an absolute evaluation vector $A_i$ that represents the absolute evaluations of respective alternatives independent of a combination of plural alternatives, based on the feature vector $D_{\phi j}$ of each alternative j. For example, the absolute evaluation calculation unit 120 calculates absolute evaluation values $a_{ij}=\omega_1 \times \alpha_{j1}+\omega_2 \times \alpha_{j2}+, \ldots, +\omega_{d\phi} \times \alpha_{d\phi}$, which are measures of the absolute evaluations of the alternatives j, from an inner product obtained by multiplying the feature vectors $D_{\phi j}=(\alpha_{j1}, \alpha_{j2}, \ldots, \alpha_{jd\phi})$ of the alternatives j by weight vectors $w_\phi=(\omega_1, \omega_2, \ldots, \omega_{d\phi})$, to calculate an absolute evaluation vector $A_i=(a_{i1}, a_{i2}, \ldots, a_{im[i]})$ of absolute evaluation values of all the alternatives ($j \in m_{[i]}$) of the choice set i. Note that elements $(\omega_1, \omega_2, \ldots, \omega_{d\phi})$ of the weight vectors $w_\phi$, correspond to respective elements of the feature vectors $D_{\phi j}$, where the weighting factors are configured to weight respective feature values.

According to an embodiment, the absolute evaluation calculation unit 120 calculates the absolute evaluation vector $Ai=(a_{i1}+b, a_{i2}+b, \ldots, a_{ij}+b)$, whose elements are the absolute evaluation values $a_{\phi j}$ plus a bias b. For example, the absolute evaluation calculation unit 120 can calculate the absolute evaluation vector $A_i$ from $A_i=b \times 1_{m[i]}+\phi_i w_\phi$ using the feature matrix $\phi_i$ of feature vectors $D_{\phi j}$ of all alternatives, where $1_{m[i]}$ is an m[i]-dimensional vector whose elements are all 1s. The absolute evaluation calculation unit 120 sends the calculated absolute evaluation vectors to the relative evaluation calculation unit 150.

Next, in step S130, the similarity matrix calculation unit 130 calculates a similarity matrix that represents similarity of feature vectors among plural alternatives. For example, the similarity matrix calculation unit 130 can multiply $m[i] \times d_\phi$ feature matrices $\phi_i$ by $d_\phi \times d_\phi$, constant matrices $\Omega_\phi$ and the transposes $\phi_i^T$ of the feature matrices, and use the results $\phi_i \Omega_\phi \phi_i^T$ as a similarity matrix $S_i$.

In calculating the similarity matrix $S_i$, the similarity matrix calculation unit 130 calculates each element $s_{ab}$ from each pair of alternatives in the same choice set based on the product of multiplying the transpose $D_{\phi a}^T$ of the feature vector of the first alternative a by the constant matrix $\Omega_\phi$ and the feature vector $D_{\phi b}$ of the second alternative b. Each element $s_{ab}$ of the similarity matrix $S_i$ is an inner product that represents the degree to which the feature vectors of the alternative a and alternative b resemble each other in the same choice set, and the Euclidean distance in the feature space in which such an inner product is defined coincides with the Mahalanobis distance, which takes the inverse matrix of the constant matrix $\Omega_\phi$ as a variance-covariance matrix.

Here, the constant matrix $\Omega_\phi$ is a relativization parameter that generates a relative evaluation vector $u^*_i$ from the absolute evaluation vector $A_i$ of the choice set i. According to an embodiment, the constant matrix $\Omega_\phi$ is initialized in advance and can be updated as the learning apparatus 200 learns. Alternatively, each element of the constant matrix $\Omega_\phi$ has a fixed value. For example, the constant matrix $\Omega_\phi$ is a unit matrix. The similarity matrix calculation unit 130 sends the similarity matrices $S_i$ to the relativized-matrix calculation unit 140.¥

Next, in step S140, based on the similarity matrix $S_i$ that represents a similarity among plural alternatives, the relativized-matrix calculation unit 140 calculates a relativized matrix Hi that represents the relative absolute evaluation values $a_{\phi j}$ between each pair of m[i] alternatives when m[i] alternatives are present in the choice set i. For example, the relativized-matrix calculation unit 140 calculates a relativized matrix $H_i = S_i (I_{m[i]} + S_i)^{-1}$ based on a product of the similarity matrix $S_i$ with a matrix inverse of the sum of the similarity matrix $S_i$ and an m[i]×m[i] unit matrix $I_{m[i]}$. The relativized-matrix calculation unit 140 sends the calculated relativized matrices $H_i$ to the relative evaluation calculation unit 150.

Next, in step S150, the relative evaluation of each alternative in the choice set is calculated from the absolute evaluation vector and relativized matrix. For example, the relative evaluation calculation unit 150 calculates the relative evaluation vector $u^*_i = (u_{i1}, u_{i2}, \ldots, u_{im[i]})$ containing the relative evaluation values $u_{ij}$ that represent relative evaluations of the alternatives j, when the m[i] alternatives in the choice set i are present. According to an embodiment, the relative evaluation calculation unit 150 calculates the relative evaluation vector $u^*_i$ product of multiplying the relativized matrix $H_i$ by the absolute evaluation vector $A_i$, and calculates the relative evaluation vector $u^*_i$ using Equation 1:

$$u_i^* = (\Phi_i \Omega_\phi \Phi_i^T)(I_{m[i]} + \Phi_i \Omega_\phi \Phi_i^T)^{-1}(b1_{m[i]} + \Phi_i w_\phi) \quad \text{(Equation 1)}$$

Here, the relative evaluation values $u_{ij}$ of the relative evaluation vector $u^*_i$ determine the probability that the chooser will choose alternative j in the choice set i. For example, in the case of multiple choices, in which the user chooses one alternative from a plurality of alternatives, an exponential ratio of the relative evaluation value $u_{ij}$ of each alternative j in the choice set i equals the ratio of the choice probability of the alternative. That is, the relative evaluation value $u_{ij}$ corresponds to the logarithmic likelihood in a multinomial log it model.

In addition, for example, for a factorial dichotomous choice in which the user chooses a desired number of alternatives from a plurality of alternatives, an output value obtained by providing the relative evaluation value $u_{ij}$ of the alternative j to a sigmoid function equals the probability of choosing the alternative j. The relative evaluation calculation unit 150 sends the relative evaluations to the estimation unit 180 or learning apparatus 200.

In this way, according to an embodiment, by performing steps S110 to S150, the calculation apparatus 100 calculates the relative evaluation vector $u^*_i$ that corresponds to the probability that each alternative in each choice set i will be selected from the choice set i. In particular, by taking into consideration the absolute evaluation of each alternative and the similarity of features between each pair of choices, the calculation apparatus 100 can calculate a relative evaluation vector $u^*_i$ that includes the relative evaluation of each alternative j in the choice set i. This allows the calculation apparatus 100 to evaluate each alternative by reflecting choice intransitivity.

According to an embodiment, the feature vectors $D_{\phi b}$ used by the similarity matrix calculation unit 130 to calculate the similarity matrix $S_i$ in S130 may be the same as, or different from the feature vectors $D_{\phi b}$ used by the absolute evaluation calculation unit 120 to calculate the absolute evaluation vector $A_i$ in S120. When the feature vectors are different, the feature vector acquisition unit 110 receives different types of feature vector $D_{\phi b}$ for each alternative and provides the feature vectors $D_{\phi b}$ to the absolute evaluation calculation unit 120 and similarity matrix calculation unit 130.

FIG. 5 is a flowchart of a method of learning according to a present embodiment. In the present embodiment, by performing steps S210 to S230, the learning apparatus 200 learns the parameters used by the calculation apparatus 100 to calculate relative evaluation vectors.

First, in step S210, the learning data acquisition unit 210 acquires learning data for plural sets of plural alternatives. For example, the learning data acquisition unit 210 acquires learning data for each choice set i from the external database 20 or from a storage device in the learning apparatus 200, where the learning data includes feature vectors $\phi_i$ that respectively represent features of m[i] alternatives and choice information about alternatives $y_i$ chosen from the m[i] alternatives in each choice set i by the user.

For example, for each choice set i, the learning data acquisition unit 210 can acquire values, such as values representing the size, color, price, performance, manufacturer, kind, etc., of a product, that result from quantifying features of the alternatives j, where $j \in m[i]$ and m[i] is the number of alternatives in the i-th choice set, and generate the first vectors $r_{ij}$ that contain these values as elements. In addition, the learning data acquisition unit 210 can acquire a second vector $q_i$ that contains values resulting from quantifying features in the choice set i selected by the user as elements, where features include, for example, the sex, age, generation, occupation, nationality, address, hobby, and past purchase history of the user.

Next, for each alternative j in the choice set i, the learning data acquisition unit 210 generates a third vector $x_{ij} = (q_i^T, r_{ij}^T)$ by combining the second vector $q_i$ and first vector $r_{ij}$. By including the second vector $q_i$, which is based on user's features, in the third vectors $x_{ij}$, the learning apparatus 200 has the calculation apparatus 100 calculate the relative evaluations of the alternatives taking into consideration the influence of the user's attributes. Alternatively, the learning data acquisition unit 210 can use a third vector $x_{ij}$ that includes only the first vector $r_{ij}$.

According to an embodiment, the learning data acquisition unit 210 can provide the third vectors $x_{ij}$ to a feature vector function that outputs $d_\phi$-dimensional feature vectors $D_{\phi j}$. For example, the learning data acquisition unit 210 provides the third vector $x_{ij}$ to $d_\phi$ radial basis functions that differ in their center coordinates, calculates $d_\phi$ feature values $\alpha_{j1}$ to $\alpha_{jd\phi}$, and acquires the feature vector $D_{\phi j} = (\alpha_{j1}, \alpha_{j2}, \ldots, \alpha_{jd\phi})$ containing the feature values as elements. Alternatively, the learning data acquisition unit 210 can output the feature vector $D_{\phi j}$ using a random decision forest, or can use the third vector $x_{ij}$ itself as the feature vector $D_{\phi j}$.

According to an embodiment, the learning data acquisition unit 210 uses as learning data a set of the feature vectors $D_{\phi j}$ of all the alternatives in each choice set i acquired in this way and the chosen alternatives $y_i$. The learning data acquisition unit 210 provides the acquired learning data to the learning processor 220 and calculation apparatus 100.

Next, in step S220, based on the learning data, the learning processor 220 learns the parameters used by the calculation apparatus 100 to calculate the relative evaluation vectors u*$_i$. For example, the learning processor 220 can have the calculation apparatus 100 perform steps S110 to S150 to calculate the relative evaluation vectors u*$_i$ based on the feature vectors in the learning data, and can adjust parameters used by the calculation apparatus 100 so that the relative evaluation vectors u*$_i$ will match the actually chosen alternatives y$_i$ in the learning data.

According to an embodiment, as a parameter, the learning processor 220 adjusts a conversion parameter used to convert the feature vectors D$_{\phi j}$ into the absolute evaluation vector A$_i$ and/or a relativization parameter which defines the constant matrix $\Omega_\phi$ used to convert the similarity matrix S$_i$ into the relativized matrix H$_i$. For example, as a conversion parameter, the learning processor 220 can adjust the weight vector w$_\phi$ and/or the value of the bias b. In addition, for example, as a relativization parameter, the learning processor 220 can adjust the constant matrix $\Omega_\phi$.

According to an embodiment, the learning processor 220 learns parameters of the calculation apparatus 100 to improve a relative evaluation u$_{iyi}$ of the alternative y$_i$ indicated by choice information, in the relative evaluation vector u*$_i$. In addition, the learning processor 220 learns the parameters of the calculation apparatus 100 to increase a total value obtained across the plural choice sets by adding values based on the relative evaluations u$_{iyi}$ of the alternatives y$_i$ indicated by corresponding choice information in the relative evaluation vectors u*$_i$ of the respective choice sets i.

For example, the learning processor 220 learns the parameters of the calculation apparatus 100 by solving Equation (3), which includes a function l(u*$_i$, y$_i$) based on the relative evaluations u$_{iyi}$ of the alternatives y$_i$ as defined in Equation (2). Specifically, the learning processor 220 performs a maximum a posteriori probability (MAP) estimation by performing the optimization of Equation (3) while preventing excessive adaptation by using a Gaussian prior distribution. The learning processor 220 has calculation apparatus 100 perform steps S110 to S150 multiple times, and thereby performs a convex optimization for the conversion parameter. For example, the calculation apparatus 100 can obtain an optimum value of the convex optimization using a Newton-Raphson method. In Equation (3), the notation ||•|| is the L2 norm and c is a regularization hyper-parameter. The term c/2×||w$_\phi$||$^2$ is a penalty term used to avoid excessive adaptation and is optional.

$$l(u_i^*, y_i) \triangleq u_{iy_i}^* - \log\left(\sum_{j'=1}^{m[i]} \exp(u_{i,j'}^*)\right) \quad \text{Equation (2)}$$

$$\max_{b,w} \sum_{i=1}^{n} l(bH_i 1_{m[i]} + H_i \Phi_i w) - \frac{c}{2}\|w_\phi\|^2 \quad \text{Equation (3)}$$

Here, the learning processor 220 learns the conversion parameters by fixing the relativization parameter. For example, when the learning data acquisition unit 210 acquires the feature vectors D$_{\phi j}$ using a radial basis function in step S210, the learning processor 220 learns the conversion parameter by fixing the relativized matrix $\Omega_\phi$ as a unit matrix. On the other hand, when the features of the alternatives in the learning data are complicated, the learning data acquisition unit 210 can acquire feature vectors D$_{\phi j}$ using a random decision forest in step S210 and learn both the relativization parameter and conversion parameter.

According to an embodiment, when learning both the relativization parameter and conversion parameter, the learning processor 220 learns the relativization parameter with the conversion parameter fixed, and learns the conversion parameter with the relativization parameter fixed. For example, the learning processor 220 performs the learning in step S220 by repeating the steps of alternately learning either the relativization parameter or the conversion parameter with the other fixed.

Next, in step S230, the learning apparatus 200 outputs the learning results. For example, the learning apparatus 200 provides the conversion parameter and relativization parameter obtained by learning to the calculation apparatus 100. The calculation apparatus 100 sets the received parameters for use in the process of calculating the relative evaluation vectors u*$_i$.

In this way, the learning apparatus 200 learns the parameters of the calculation apparatus 100 by performing steps S210 to S230. In particular, the learning apparatus 200 use the calculation apparatus 100 to learn learning data, including intransitive choices, to thereby calculate the relative evaluation vectors u*$_i$ for predicting intransitive choices.

Note that although a present embodiment has been described with the learning data acquisition unit 210 generating feature vectors from the learning data, alternatively the feature vectors may be generated by the feature vector acquisition unit 110 of the calculation apparatus 100. In that case, the learning data acquisition unit 210 can provide to the feature vector acquisition unit 110 the feature information for each alternative contained in the learning data for the feature vector acquisition unit 110 to generate feature vectors from the information.

Figures 6, 7:
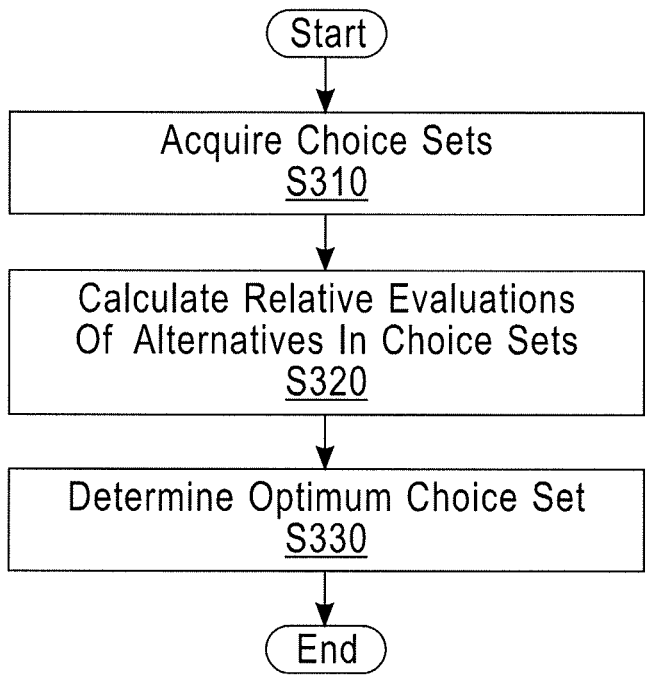
FIG. 6 is a flowchart of a method of calculating according to a present embodiment.
FIG. 7 illustrates choice probabilities of a target alternative in plural choice sets.

FIG. 6 is a flow chart of a method of calculating according to a present embodiment. In a present embodiment, by performing steps S310 to S330, the calculation apparatus 100 can determine a choice set for a user to choose a desired alternative with higher probability. Note that before performing the process shown in FIG. 6, the learning apparatus 200 performs a learning process of steps S210 to S230.

First, in step S310, the choice set input unit 170 accepts, as input from a user, a predetermined target alternative t chosen by the user as well as I plural choice sets, where I is an integer greater than 0, each including the target alternative t and differing in a combination of alternatives. For example, for each choice set i, i∈I, the choice set input unit 170 accepts values that result from quantifying features of each alternative as input from the user.

Next, the choice set input unit 170 generates feature vectors D$_{\phi j}$ of m[i] alternatives j in I received choice sets i and sends the generated feature vectors D$_{\phi j}$ to the feature vector acquisition unit 110 and determination unit 190. For example, the choice set input unit 170 can generate the feature vector D$_{\phi j}$ of each alternative j in the I choice sets by a method similar to that of step S210 and send the generated feature vectors D$_{\phi j}$ to the feature vector acquisition unit 110 and determination unit 190.

Next, in step S320, the estimation unit 180 estimates the choice probability that each alternative in the choice set will be chosen, based on the relative evaluation value u$_{ij}$ of each alternative j in the relative evaluation vector u*$_i$.

For example, by carrying out the process of steps S110 to S150 with respect to the feature vector D$_{\phi j}$ of each alternative j in each choice set i received by the feature vector acquisition unit 110, the calculation apparatus 100 generates the relative evaluation vector u*$_i$ of each choice set i, where i∈I. Here, when performing step S150, the relative evaluation calculation unit 150 calculates the relative evaluation vector $u^*_i$, including a relative evaluation value $u_{it}$ of the target alternative t, for each of the I choice sets.

Next, the estimation unit 180 calculates the choice probabilities of the alternatives j in the choice set i based on values of the relative evaluation values $u_{ij}$ that are elements of the relative evaluation vector $u^*_i$. For example, when the choice set i has multiple choices, the estimation unit 180 normalizes values, such as the exponent of the value of the function $l(u^*_{i,j})$ in Equation (2), which are based on the exponents of the relative evaluation values $u_{ij}$ of the alternatives j, such that the total in the choice set i will be 1, and after normalization, estimates the exponents of the relative evaluation values $u_{ij}$ as the choice probabilities $p_{ij}$ of the alternatives j. In addition, for example, when the choice set i has a factorial dichotomous choice, the estimation unit 180 estimates, as the choice probability $p_{ij}$ of the alternative j, the value that results when the relative evaluation value $u_{ij}$ of each alternative j is provided to a sigmoid function. The estimation unit 180 sends estimation results to the determination unit 190.

Next, in step S330, based on the relative evaluation values $u_{it}$ of the target alternative t, the determination unit 190 chooses a choice set i', where i'∈I, from the plural choice sets received from the choice set input unit 170, from which the user is highly likely to choose the target alternative t, and determines a combination of other alternatives to be presented together with the target alternative t. For example, based on the estimation results produced by the estimation unit 180, the determination unit 190 determines a combination of a choice set i' in which the choice probability $p_{it}$ of the target alternative t is the highest, and a choice set i' in which the choice probability $p_{it}$ is higher than a predetermined standard.

In this way, according to an embodiment, by carrying out steps S310 to S330, the calculation apparatus 100 can estimate a choice probability of each alternative in plural choice sets based on the relative evaluation vectors. Since the relative evaluation vector reflects the choice intransitivity, the calculation apparatus 100 can process intransitive choices from a user. This allows the calculation apparatus 100 to determine the choice set to be presented to a user so that a target alternative with the highest probability can be chosen.

FIG. 7 illustrates choice probabilities of a target alternative in plural choice sets. For example, in step S310, the choice set provided to input unit 170 includes choice set 1, which has alternative A, alternative B, and alternative C, choice set 2, which has alternative B, alternative C, and alternative D, and choice set 3, which has alternative C, alternative D, and alternative E, and where each of the choice sets includes a target alternative, namely alternative C.

In step S320, the estimation unit 180 estimates the choice probability of each alternative in the choice sets 1 to 3 as illustrated. For example, the estimation unit 180 estimates the choice probability of the target alternative C in the choice set 1 to be 18%, the choice probability of the target alternative C in the choice set 2 to be 38%, and the choice probability of the target alternative C in the choice set 3 to be 24%. Consequently, in step S330, the determination unit 190 can determine choice set 2, in which the target alternative C has the highest choice probability, to be the choice set to be presented to the user.

For example, in planning and developing a new product in a field in which competitors already exist, the calculation apparatus 100 can predict a product which is likely to be able to gain a market share and a product which is not likely to be able to gain a market share. Taking the coffee market as an example, it is possible to predict how much market share a medium-priced, medium-quality, store-extracted, convenience store coffee can gain when introduced into a market in which there exists a high-priced, full-service, high-quality, cafe chain, a low-priced, self-serve, cartridge coffee product, and a medium-priced, low-quality, coffee beverage product.

Figure 8:
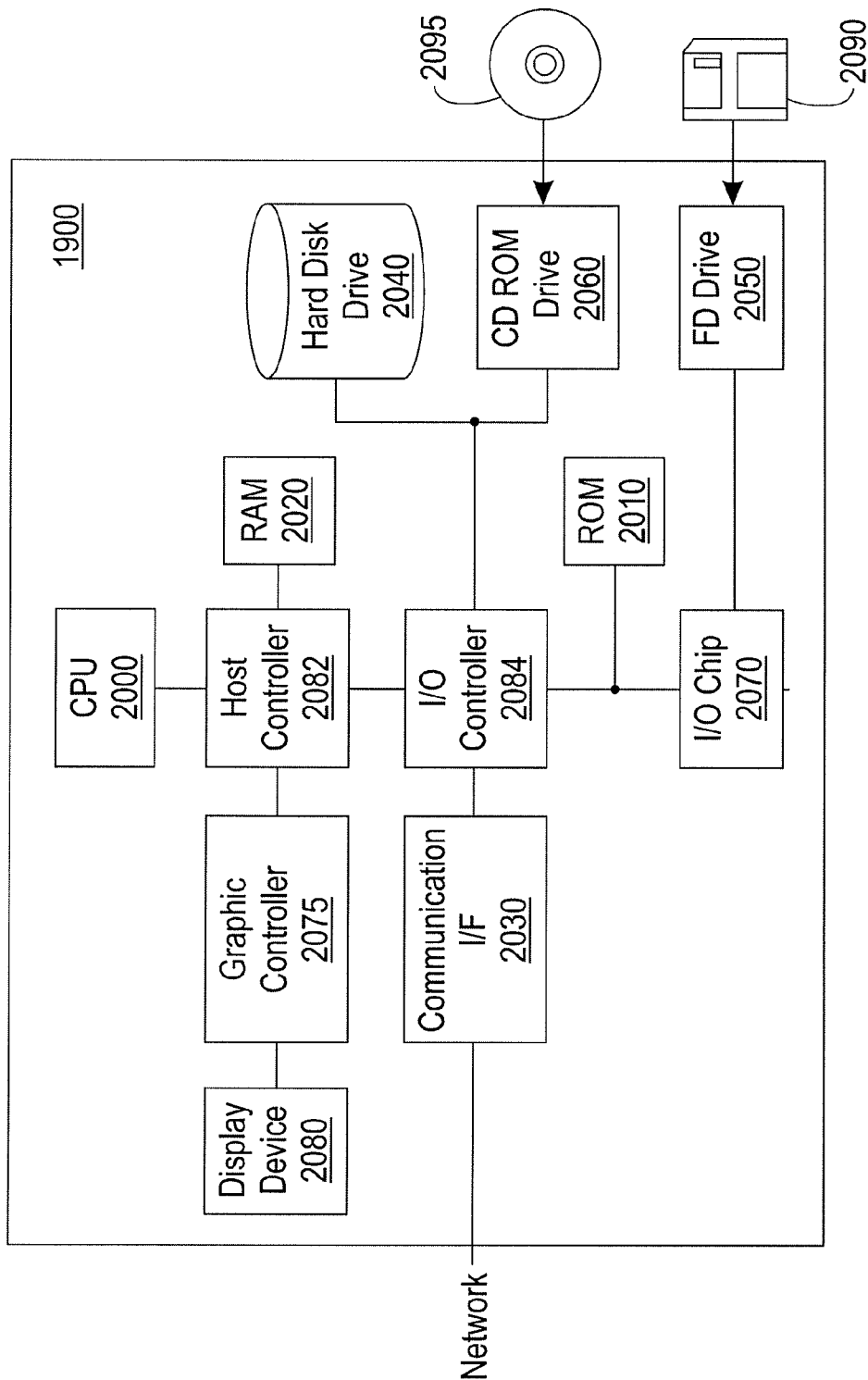
FIG. 8 shows an exemplary hardware configuration of a computer according to a present embodiment.

FIG. 8 shows an exemplary hardware configuration of a computer 1900 according to an embodiment which functions as the calculation apparatus 100 and learning apparatus 200. The computer 1900 according to a present embodiment includes a CPU 2000, a RAM 2020, a graphics controller 2075, and a display device 2080 interconnected via a host controller 2082; I/O units which include a communications interface 2030, a hard disk drive 2040, and a CD-ROM drive 2060 which are connected to the host controller 2082 via an I/O controller 2084; and legacy I/O units which include a ROM 2010, a flexible disk drive 2050, and an I/O chip 2070 which are connected to the I/O controller 2084.

The host controller 2082 connects the RAM 2020 with the CPU 2000 and graphics controller 2075, which access the RAM 2020 at a high transfer rate. The CPU 2000 operates various programs stored in the ROM 2010 and RAM 2020 and controls the various components of computer 1900. The graphics controller 2075 acquires image data generated by the CPU 2000 from the frame buffer provided in the RAM 2020 and displays the image data on the display device 2080. Alternatively, the graphics controller 2075 may contain a frame buffer to store image data generated by the CPU 2000.

The I/O controller 2084 connects the host controller 2082 with the communications interface 2030, hard disk drive 2040, and CD-ROM drive 2060 which are relatively high-speed I/O devices. The communications interface 2030 conducts communications and communicates with other apparatuses via a wireline or wireless network. The hard disk drive 2040 stores programs and data used by the CPU 2000 in the computer 1900. The CD-ROM drive 2060 can read a program or data from the CD-ROM 2095 and provide the program or data to the hard disk drive 2040 via the RAM 2020.

In addition, the I/O controller 2084 is connected with the ROM 2010, flexible disk drive 2050, and I/O chip 2070, which are relatively low-speed I/O devices. The ROM 2010 stores a boot program executed by the computer 1900 at startup and/or programs dependent on hardware of the computer 1900. The flexible disk drive 2050 can read a program or data from the flexible disk 2090 and provide the program or data to the hard disk drive 2040 via the RAM 2020. The I/O chip 2070 connects the flexible disk drive 2050 to the I/O controller 2084 as well as connects various I/O devices to the I/O controller 2084, for example, via a parallel port, serial port, keyboard port, mouse port, etc.

The programs stored in the hard disk drive 2040 via the RAM 2020 may be received from the user via a recording medium such as the flexible disk 2090, CD-ROM 2095, an IC card, etc. The programs can be read from the recording medium, installed on the hard disk drive 2040 in the computer 1900 via the RAM 2020, and executed by the CPU 2000.

The programs installed on the computer 1900 and configured to function as the calculation apparatus 100 and learning apparatus 200 include a feature vector acquisition module, an absolute evaluation calculation module, a similarity matrix calculation module, a relativized-matrix calculation module, a relative evaluation calculation module, a choice input module, an estimation module, a determination module, a learning data acquisition module, and a learning processing module. These programs or modules can be executed by the CPU 2000 so that the computer 1900 can function as the feature vector acquisition unit 110, absolute evaluation calculation unit 120, similarity matrix calculation unit 130, relativized-matrix calculation unit 140, relative evaluation calculation unit 150, choice set input unit 170, estimation unit 180 and determination unit 190 of the calculation apparatus 100 as well as the learning data acquisition unit 210 and learning processor 220 of the learning apparatus 200.

When read into the computer 1900, information processing described in these programs can function as the feature vector acquisition unit 110, absolute evaluation calculation unit 120, similarity matrix calculation unit 130, relativized-matrix calculation unit 140, relative evaluation calculation unit 150, choice set input unit 170, estimation unit 180, and determination unit 190 of the calculation apparatus 100 as well as the learning data acquisition unit 210 and learning processor 220 of the learning apparatus 200, all of which result from combination of software with the above-stated hardware resources of various types. Then, depending on the intended use of the computer 1900 according to the present embodiment, these units can perform computations or edit information to build the calculation apparatus 100 and learning apparatus 200 specific to the intended use.

As an example, when the computer 1900 communicates with external devices, the CPU 2000 executes a communications program loaded into the RAM 2020 and instructs the communications interface 2030 to carry out communications processing based on processing details described in the communications program. Under the control of the CPU 2000, the communications interface 2030 reads transmit data out of a transmit buffer area provided on a storage device such as the RAM 2020, hard disk drive 2040, flexible disk 2090, or CD-ROM 2095, and transmits the transmit data to a network, or writes receive data received from the network into a receive buffer area provided on the storage device. In this way, the communications interface 2030 can transfer the transmit/receive data to/from the storage device in a DMA (Direct Memory Access) mode. Alternatively, the CPU 2000 can transmit the transmit/receive data by reading the data from the storage device or communications interface 2030 at the source and writing the data into the communications interface 2030 or storage device at the destination.

In addition, the CPU 2000 reads all or the necessary parts of files, databases, etc., stored in an external storage device such as the hard disk drive 2040, CD-ROM drive 2060 (CD-ROM 2095), or flexible disk drive 2050 (flexible disk 2090) into the RAM 2020 by DMA transfer and performs various processing on the data in the RAM 2020. Then, the CPU 2000 writes the processed data back into the external storage device by a DMA transfer. In such processing, the RAM 2020 temporarily stores contents of the external storage device, and thus in the present embodiment, the RAM 2020, the external storage device, etc., are generically referred to as a memory, storage unit, or storage device, etc. For example, the storage unit of the calculation apparatus 100 and/or learning apparatus 200 can store, as appropriate, data received from or data to be transmitted to the feature vector acquisition unit 110, absolute evaluation calculation unit 120, similarity matrix calculation unit 130, relativized-matrix calculation unit 140, relative evaluation calculation unit 150, choice set input unit 170, estimation unit 180, and determination unit 190 of the calculation apparatus 100 and/or the learning data acquisition unit 210 and learning processor 220 of the learning apparatus 200. For example, the storage unit may receive and store the data provided to the absolute evaluation calculation unit 120 by the feature vector acquisition unit 110. In addition, the storage unit may store the relative evaluation vectors calculated by the relative evaluation calculation unit 150.

According to a present embodiment, various information, such as programs, data, tables, and databases can be stored in a storage device such as described above and processed. Note that the CPU 2000 can store part of the RAM 2020 in a cache memory and perform reads and writes from the cache memory. In such a form, the cache memory, which functions as part of the RAM 2020, and can be regarded as part of the RAM 2020, memory, and/or storage device unless otherwise disclosed.

In addition, the CPU 2000 can perform various processing as specified by instruction sequences of a program on data read from the RAM 2020 and write the data back into the RAM 2020, where the processing may include computations, editing of information, conditional judgments, and information searches and replacements as described in a present embodiment. For example, when executing a conditional judgment, the CPU 2000 determines whether certain variables are greater than, less than, equal to or greater than, equal to or less than, or equal to another variable or constant, and branches to a different instruction sequence or calls a subroutine when a condition is satisfied or not satisfied.

In addition, the CPU 2000 can search for information stored in a file or database in the storage device. For example, when a plurality of entries are stored in the storage device, and values of a second attribute are respectively associated with values of a first attribute, the CPU 2000 can search the plurality of entries in the storage device for an entry whose first attribute has a value which satisfies a specified condition, read the value of the second attribute from the entry and thereby obtain the value of the second attribute associated with the first attribute which satisfies a predetermined condition.

Whereas embodiments of the present disclosure have been described with reference to exemplary embodiments, the technical scope of embodiments of the present disclosure is not limited to the scope of the exemplary embodiments herein described. It is apparent to those skilled in the art that various changes or improvements can be made to the exemplary embodiments described above. It will be apparent from the description of the appended claims that any form resulting from such changes or improvements is also included in the technical scope of the present disclosure.

The invention claimed is:

1. A calculation apparatus for predicting intransitive choices from a discrete choice model, comprising:
   a feature vector acquisition unit configured to acquire a feature vector corresponding to each of a plurality of alternatives in each of a plurality of choice sets;
   an absolute evaluation calculation unit configured to calculate an absolute evaluation vector that represents an absolute evaluation of alternatives independent of a combination of the plurality of alternatives, based on the feature vector corresponding to each alternative;
   a relativized-matrix calculation unit configured to calculate a relativized matrix that represents relative evaluations of the plurality of alternatives in the choice sets;
   a relative evaluation calculation unit configured to calculate a relative evaluation vector that represents a relative evaluation of each alternative of the plurality of alternatives based on a product of multiplying the relativized matrix by the absolute evaluation vector; and a determination unit configures to choose the choice set based on the relative evaluation of the predetermined alternative and determine a combination of other alternatives to be presented together with the predetermined alternative.

2. The calculation apparatus according to claim 1, further comprising a similarity matrix calculation unit configured to calculate a similarity matrix that represents similarity of the feature vectors of the plurality of alternatives, wherein the relativized-matrix calculation unit calculates the relativized matrix based on the similarity matrix.

3. The calculation apparatus according to claim 2, wherein the relativized-matrix calculation unit calculates the relativized matrix to evaluate two alternatives with a higher similarity compared to two alternatives with a lower similarity.

4. The calculation apparatus according to claim 2, wherein the similarity matrix calculation unit calculates the similarity matrix of the plurality of alternatives from a product of multiplying a transpose of the feature vector of a first alternative by a constant matrix and the feature vector of a second alternative.

5. The calculation apparatus according to claim 2, wherein the relativized-matrix calculation unit calculates the relativized matrix from a product of the similarity matrix $S_i$ with a matrix inverse of the sum of the similarity matrix and a unit matrix.

6. The calculation apparatus according to claim 1, wherein the absolute evaluation calculation unit calculates the absolute evaluation vector from a product of multiplying the feature vector of each alternative by a weight vector that weights each feature value.

7. The calculation apparatus according to claim 6, wherein the absolute evaluation calculation unit calculates the absolute evaluation vector from a product of multiplying the feature vector of each alternative by the weight vector that weights each feature value and then adding a bias to each element.

8. The calculation apparatus according to claim 1, further comprising an estimation unit configured to estimate a choice probability that each alternative will be chosen from the relative evaluation of each alternative in the relative evaluation vector.

9. The calculation apparatus according to claim 1, wherein the relative evaluation calculation unit calculates a relative evaluation of a predetermined alternative in each of a plurality of choice sets, each including the predetermined alternative and differing in a combination of other alternatives.

10. A program storage device readable by a computer, tangibly embodying a program of instructions executed by the computer to implement a system for the calculation apparatus according to claim 1.

11. An apparatus for learning parameters of a calculation apparatus for predicting intransitive choices from a discrete choice model, the learning apparatus comprising:

a learning data acquisition unit configured to acquire learning data that includes a feature vector of each of a plurality of alternatives, and choice information that represents an alternative chosen by a user from the plurality of alternatives; and a learning processor configured to improve a relative evaluation of the alternative represented by the choice information by adjusting a conversion parameter that converts the feature vector into an absolute evaluation vector.

12. The learning apparatus according to claim 11, wherein:

the learning data acquisition unit acquires the learning data for the plurality of alternatives from a plurality of choice sets; and the learning processor adjusts a conversion parameter used to convert the feature vector into the absolute evaluation vector to increase a total value obtained across the plurality of choice sets by adding values based on the relative evaluations of the alternatives represented by corresponding choice information.

13. The learning apparatus according to claim 11, wherein an absolute evaluation vector that represents an absolute evaluation of alternatives independent of a combination of the plurality of alternatives is calculated from a product of multiplying the feature vector by a weight vector that weights each feature value; and the learning processor adjusts the weight vector as the conversion parameter.

14. The learning apparatus according to claim 13, wherein:

the absolute evaluation vector is calculated from a product of multiplying the feature vector of each alternative by the weight vector and then adding a bias to each element; and the learning processor adjusts the weight vector and the bias as the conversion parameters.

15. The learning apparatus according to claim 13, wherein the learning processor further adjusts a relativization parameter which defines a relativized matrix that represents relative evaluations of the plurality of alternatives.

16. The learning apparatus according to claim 15, wherein:

the relativized matrix is calculated from a similarity matrix that represents similarity of the plurality of alternatives;

the similarity matrix is calculated from the plurality of alternatives, as the relativization parameter, from a product of multiplying a transpose of the feature vector of a first alternative by a constant matrix and the feature vector of a second alternative; and the learning processor adjusts the constant matrix.

17. The learning apparatus according to claim 15, wherein the learning processor learns the relativization parameter with the conversion parameter fixed, and learns the conversion parameter with the relativization parameter fixed.

18. A program storage device readable by a computer, tangibly embodying a program of instructions executed by the computer to implement a system for the learning apparatus according to claim 11.

19. A computer-implemented method for calculating relative evaluations of intransitive alternatives in a discrete choice model, the method executed by the computer comprising the steps of:

acquiring a feature vector that corresponds to each of a plurality of alternatives included in each of a plurality of choice sets;

calculating an absolute evaluation vector that represents an absolute evaluation of alternatives independent of a combination of the plurality of alternatives based on the feature vector corresponding to each alternative;

calculating a relativized matrix that represents conversion of relative evaluations of the plurality of alternatives in the choice sets;

calculating a relative evaluation vector that represents a relative evaluation of each alternative of the plurality of alternatives from a product of multiplying the relativized matrix by the absolute evaluation vector; and choosing a choice set based on the relative evaluation of the predetermined alternative and determine a combination of other alternatives to be presented together with the predetermined alternative.

20. A computer-implemented method for learning parameters for a calculation method for predicting intransitive choices from a discrete choice model, the method executed by the computer comprising the steps of:

acquiring learning data for each set of a plurality of alternatives, the learning data including a feature vector of each of the plurality of alternatives, and choice information that represents an alternative chosen by a user from the plurality of alternatives; and improving the relative evaluation of the alternative indicated by the choice information in the relative evaluation vector by adjusting a conversion parameter that converts the feature vector into the absolute evaluation vector.

* * * * *